Nov. 17, 1931.    J. R. McINTOSH    1,831,870
FISH LURE
Filed April 5, 1928
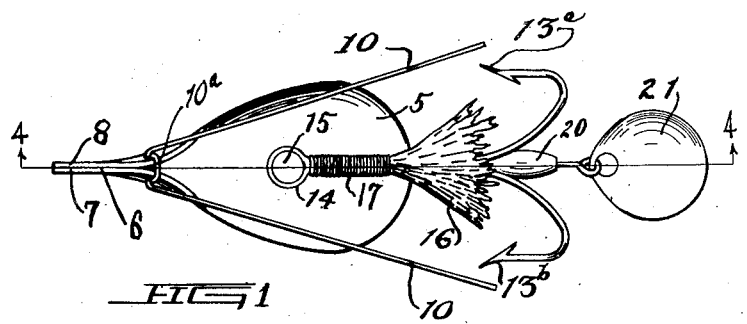
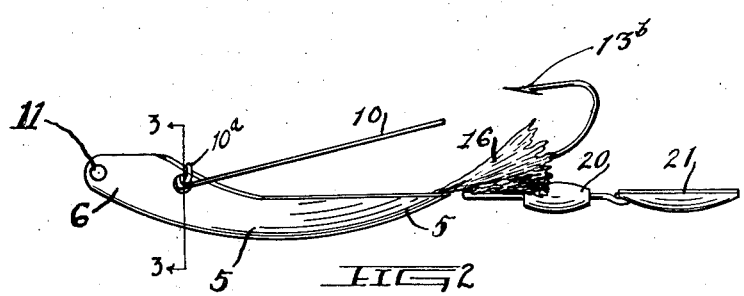
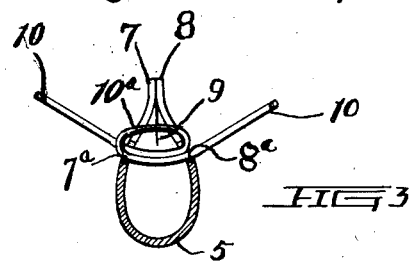
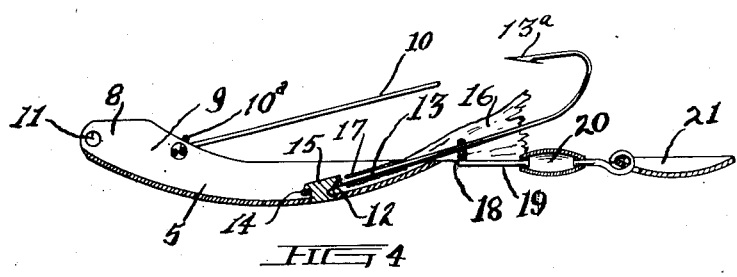
INVENTOR
J. R. McIntosh
BY
F. E. Shannon ATTORNEY Patented Nov. 17, 1931

1,831,870

UNITED STATES PATENT OFFICE

JAMES RUSSELL McINTOSH, OF BOBCAYGEON, ONTARIO, CANADA, ASSIGNOR, BY DIRECT AND MESNE ASSIGNMENTS, TO THE ENTERPRISE MANUFACTURING COMPANY, OF AKRON, OHIO, A CORPORATION OF OHIO

FISH LURE

Application filed April 5, 1928. Serial No. 267,512.

This invention relates to new and novel improvements in artificial fish bait and has particular reference to a spoon bait adapted for use in casting or trolling.

Objects of the invention are to provide an artificial bait of simple construction which may be manufactured at a low cost and which will be very efficient in use.

A further object is to provide a new and improved fishing lure which includes a spoon body adapted to be normally disposed in a horizontal plane with the forward edges of the body folded upwardly to provide a forwardly presented vertical fin. The spoon is thus provided with a sharp prow, and the forward end of the spoon is formed with an upwardly curved under side. It will ride or skim over logs or other obstructions at or near the surface. The sharp prow separates weeds or grass in its passage through the water. These features make the spoon particularly and peculiarly effective in locations where there are weeds or obstructions, in which locations large game fish are most numerous.

An additional object is to provide a spoon bait which is arranged to be normally positioned in the water with the hooks presented upwardly and which is arranged with new and novel arrangement of hook protecting members whereby the bait will be substantially weedless and which when struck by a fish will engage the upper or fixed jaw to securely hold the fish on the bait.

The above objects are accomplished and additional ends are attained by the novel construction, combination and arrangement of parts hereinafter described and illustrated in the accompanying drawings wherein I have shown a preferred form of the invention, it being understood that the invention is capable of various adaptations and that changes and modifications may be made or resort had to substitutions which come within the scope of the claims hereunto appended.

In the drawings like numerals of reference are used to designate like parts as the same may appear in any of the several views and in which:—

Figure 1 is a top plan view of a bait constructed in accordance with this invention, Figure 2 is a side elevational view of same, Figure 3 is a sectional view taken as indicated by the lines 3—3 of Figure 2, Figure 4 is a longitudinal, sectional view taken as indicated by the lines 4—4 of Figure 1.

Proceeding now to a detailed description of the invention with reference to the particular adaptation thereof disclosed in the drawings, the numeral 5 is used generally to designate the spoon body. The body 5 comprises a flat piece of metal the main or body portion of which is in any usual or well known form similar to spoons now in use. The forward portion of the spoon is bent or folded together so that the forward edges are in contact, positioning a sharp prow at the front of the spoon with flaring or expanding sides. The forward end of the spoon is, therefore, shaped somewhat like the bow of a canoe, with a curved keel and with a short prow so that the spoon will part weeds or grass in its path, and the curved prow will readily ride or skim over logs or other obstacles in the water. The sides 7 and 8 of the forward portion 6 are in flat abutting relation at the extreme forward portion thereof, the sides gradually converging into the spoon body 5. The rearwardly diverging side walls of the portion 6 forms a cavity 9 which extends into the forward portion 6 from the upper or concave part of the spoon 5. The side walls 7 and 8 are provided with alined openings 7a and 8a in which is loosely positioned the wire 10. The wire 10 is entered through the holes 7a and 8a of the side walls 7 and 8 from one side thereof and is carried over the upper edge of the side walls 7 and 8 and is again threaded through the holes 7a and 8a and the end portions of the wire are bent backwardly as shown in the drawings. The vertical portion 6 is provided at a point adjacent the forward edge thereof with the opening 11 which extends through both of the walls 7 and 8 for the purpose of securing a line swivel or other fastening member thereto.

The spoon is provided at a point centrally thereof with an opening 12. The numeral 13 denotes a shank member which is provided with an eye 14. A rivet or other fastening means 15 is positioned through the eye 14 and is secured in the opening 12, thus securing the shank 13 to the upper side of the spoon 5 so that it projects rearwardly at an upward inclination therefrom. The shank 13 comprises a double body terminating in upwardly presented, outwardly inclined twin hooks 13a and 13b.

The numeral 16 denotes a fly, buck tail or like element composed of feathers, hair or any suitable material which is secured around the shank of the hook 13 by the wrapping 17. The numeral 18 denotes a member which is suitably secured to the shank 13 to anchor a wire 19 or other holding member thereto. A swivel 20 is secured to the wire and a spoon 21 is operatively mounted on the swivel 20 as shown in Figure 1. It will be seen that the spoon 5 is concave on the upper side thereof and that the hooks 13a and 13b are curved upwardly and outwardly so that the main body of the spoon is below a horizontal plane extending through the opening 11 and the spoon 21. This provides a bait which when drawn through the water will be normally positioned with its convex side downwardly and with its hooks 13a and 13b presented upwardly.

The opposite ends of the wire 10 are arranged to project rearwardly toward the ends of the hooks 13a and 13b, thereby providing means tending to prevent the hooks from becoming entangled in weeds or from being caught in logs, sticks, etc. While the wire 10 is loosely and rotatably mounted in the openings 7a and 8a, the loop 10a on the wire 10 engages the upper edges of the sides 7 and 8 and limits the movement of said wire 10 in said openings.

In use, a swivel is suitably secured in the opening 11 and a line is attached thereto. When pulled through the water, the bait will glide forwardly in a smooth serpentine path, simulating the movement of a live minnow and making a very effective lure, which can be used in weedy pools or where sunken logs or débris is found, and which will not foul the weeds or obstructions.

Having thus illustrated my invention and described the same in detail, what I claim as new and desire to secure by Letters Patent is:—

1. In a fish lure, a dished body, the forward portion thereof folded to provide a fin, the side walls of said body converging to said fin, a hook secured to the concave side of said body, the shank of said hook extending rearwardly along the medial line thereof with the point of the hook projecting upwardly and forwardly and a weed wire secured to the forward portion of said body and projecting rearwardly toward the point of said hook.

2. In a fish lure, a dished body, the forward portion thereof folded to provide a fin, the side portions of said body converging to said fin, hooks secured to the concave side of said body, said side portions provided with alined openings at points spaced rearwardly from said fin and a wire mounted in said openings, the free ends of said wire projecting rearwardly to provide hook protecting elements.

3. In a fish lure, a dished body, the forward portion thereof folded to provide a fin, the side portions thereof converging to said fin, hooks secured to the concave side of said body, said hooks extending rearwardly along the medial line thereof with the points thereof presented upwardly and forwardly and a trailing spoon secured to the shanks of said hooks.

4. In a fish lure, a dished body, the forward portion thereof folded to provide a fin, the side portions thereof converging to said fin, hooks secured to the concave side of said body, said hooks extending rearwardly along the medial line thereof with the points thereof presented upwardly and forwardly, said side portions provided with alined openings at points spaced rearwardly from said fin and a wire looped in said opening with the free ends thereof presented rearwardly to provide hook protecting elements.

5. A spoon comprising a dished body, the forward edges of which are bent upwardly from the normal position so that they contact at the front of the spoon over the dished portion thereof to provide a closed sharp prow with rearwardly flaring edge portions.

6. A spoon comprising a dished body, the forward edges of which are bent upwardly over the dished portion so that they contact at the front of the spoon to provide a closed sharp prow with rearwardly flaring edge portions, the undersurface of the spoon being curved upwardly to meet the prow of the spoon.

7. A spoon comprising a dished body, the forward end of which is shaped like the forward portion of a canoe with the edges of the spoon in contact over a substantial area over the dished portion to provide a sharp prow.

8. A spoon comprising a concavo-convex body, the forward end of which is shaped like the forward portion of a canoe with the edges of the spoon in contact over a substantial area of the concave face of the spoon to provide a sharp prow, the under side of the spoon being curved upwardly to meet the prow.

9. A spoon comprising a spoon body of the usual concavo convex shape adapted to ride in the water with its convex side downwardly, the forward edges of the spoon being bent upwardly so that they meet at the front of the spoon over the concave face thereof to form a sharp prow.

10. A spoon comprising a spoon body of the usual concavo convex shape adapted to ride in the water with its convex side downwardly, the forward edges of the spoon being bent upwardly so that they meet at the front of the spoon over the concave face thereof to form a sharp prow, the under surface of which is curved upwardly to meet the prow.

In testimony whereof I have hereunto set my hand.

JAMES R. McINTOSH.